United States Patent [19]

Cheon

[11] Patent Number: 5,148,127
[45] Date of Patent: Sep. 15, 1992

[54] BIPHASE SHIFT KEYING MODULATION CIRCUIT HAVING CONSTANT ENVELOPE CHARACTERISTICS

[75] Inventor: Byoung-Jin Cheon, Suwon, Rep. of Korea

[73] Assignee: Samsung Electronics Co., Ltd., Suwon, Rep. of Korea

[21] Appl. No.: 770,240

[22] Filed: Oct. 3, 1991

[30] Foreign Application Priority Data

Oct. 8, 1990 [KR] Rep. of Korea ............. 15940

[51] Int. Cl.⁵ .......................................... H04L 27/20
[52] U.S. Cl. ....................................... 332/104; 375/55; 375/67
[58] Field of Search ................... 332/103, 104, 105; 375/55, 67

[56] References Cited

U.S. PATENT DOCUMENTS 4,748,641 5/1988 Dapper ............................. 375/67

Primary Examiner—Siegfried H. Grimm
Attorney, Agent, or Firm—Robert E. Bushnell

[57] ABSTRACT

A biphase shift keying (BPSK) modulation circuit for digital data transmission capable of preventing occurrence of signal distortion, even in phase shifting positions upon a power amplification of modulation signal, by providing a constant envelope characteristic to the modulation signal during the modulation. The BPSK modulation circuit has a clock input receiving a system clock, a data generation device connected to receive the system clock for providing random digital data in synchronization with the system clock, a data conversion device connected to receive the system clock and an output of the data generation device, for providing an in-phase signal component and a quadra-phase signal component in synchronization with the system clock, and a modulation device connected to receive both the in-phase and quadra-phase signal components from the data conversion device, for providing a phase modulation signal of constant envelope on a given carrier-wave signal for the digital data transmission. The in-phase signal component is processed in a double-balanced modulation with the carrier-wave and the quadraphase signal component is processed in a single-balanced modulation with a phase-shifted signal of the carrier-wave.

11 Claims, 3 Drawing Sheets

BIPHASE SHIFT KEYING MODULATION CIRCUIT HAVING CONSTANT ENVELOPE CHARACTERISTICS

BACKGROUND OF THE INVENTION

The present invention generally relates to a biphase shift keying (BPSK) modulation circuit for digital telecommunication systems, in particular to a constant envelope BPSK modulator for use in driving a power amplifier, inter alia, of C-class.

One of the known BPSK modulators together with its transmission circuitry is disclosed in FIG. 1, which the circuit includes a data generator 1 providing a given digital signal, a low-pass filter (LPF) 2 suppressing high-frequency components of the digital signal, and a modulator 3 for modulating in phase the filtered output from the LPF into a carrier-wave signal as shown in FIG. 2, which illustrates a waveform of the modulated output signal from the modulator 3. This modulated signal is delivered to a band-pass filter (BPF) 4 and then amplified in a C-class power amplifier 5. Antenna (ANT) receives the amplified signal for transmission into the air. This type of BPSK modulator, as shown in FIG. 1, adopts a modulation system in which a phase of the carrier-wave (CR) is instantaneously shifted in 0° and 180° in dependence upon the digital signal from the data generator, during modulation of the digital signal to the carrier-wave. Thus, when the carrier-wave (CR) passes through the BPF, a phenomena occurs in that its amplitude decreases at a given zero-crossing position, as shown by a reference symbol A of FIG. 2, during the shifting of the carrier-wave in 0° and 180°. This is because the frequency in the zero-crossing position gets out of a passing frequency band in the BPF. Therefore, in the power amplifier 5, operating in C-class level, adequate amplification of the modulated signal may not be provided at the zero-crossing positions, thereby resulting in distortion of output signals.

SUMMARY OF THE INVENTION

It is therefore an object of the present invention to provide a BPSK modulation circuit capable of preventing occurrence of signal distortion in the vicinity of phase shift upon a power amplification of a modulation signal by providing a constant envelope characteristic to the modulation signal during the BPSK modulation.

According to one aspect of the present invention, a biphase shift keying (BPSK) modulation circuit for a digital data transmission system includes:

a clock input receiving a system clock;

data generation device connected to receive the system clock, for providing random digital data in synchronization with the system clock;

data conversion device connected to receive the system clock and an output of the data generation device, for providing an in-phase signal component and a quadra-phase signal component in synchronization with the system clock; and modulation device connected to receive both the in-phase and quadra-phase signal components from the data conversion device, for providing a phase modulation signal of constant envelope on given carrier-wave signal for the digital data transmission, the in-phase signal component being processed in a double-balanced modulation with the carrier-wave and the quadra-phase signal component being processed in a single-balanced modulation with a phase-shifted signal of the carrier-wave.

DETAILED DESCRIPTION OF THE INVENTION

Hereinafter, the preferred embodiment of the BPSK modulation circuit in accordance with the invention will be described in detail with reference to the accompanying drawings.

Figure 1:
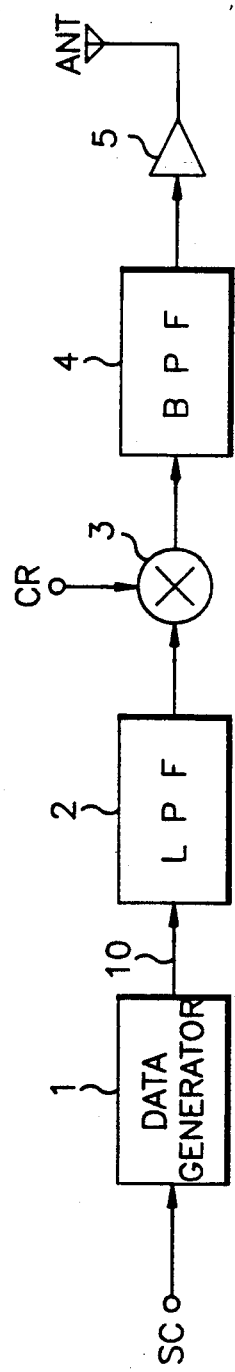
FIG. 1 is a schematic block diagram indicating a conventional BPSK modulator.
Figure 2:
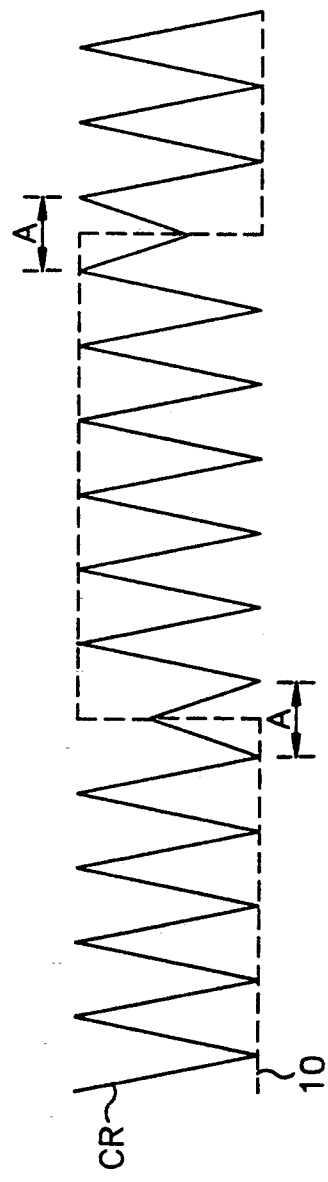
FIG. 2 is a waveform diagram of a modulated signal in the circuit of FIG. 1.
Figure 3:
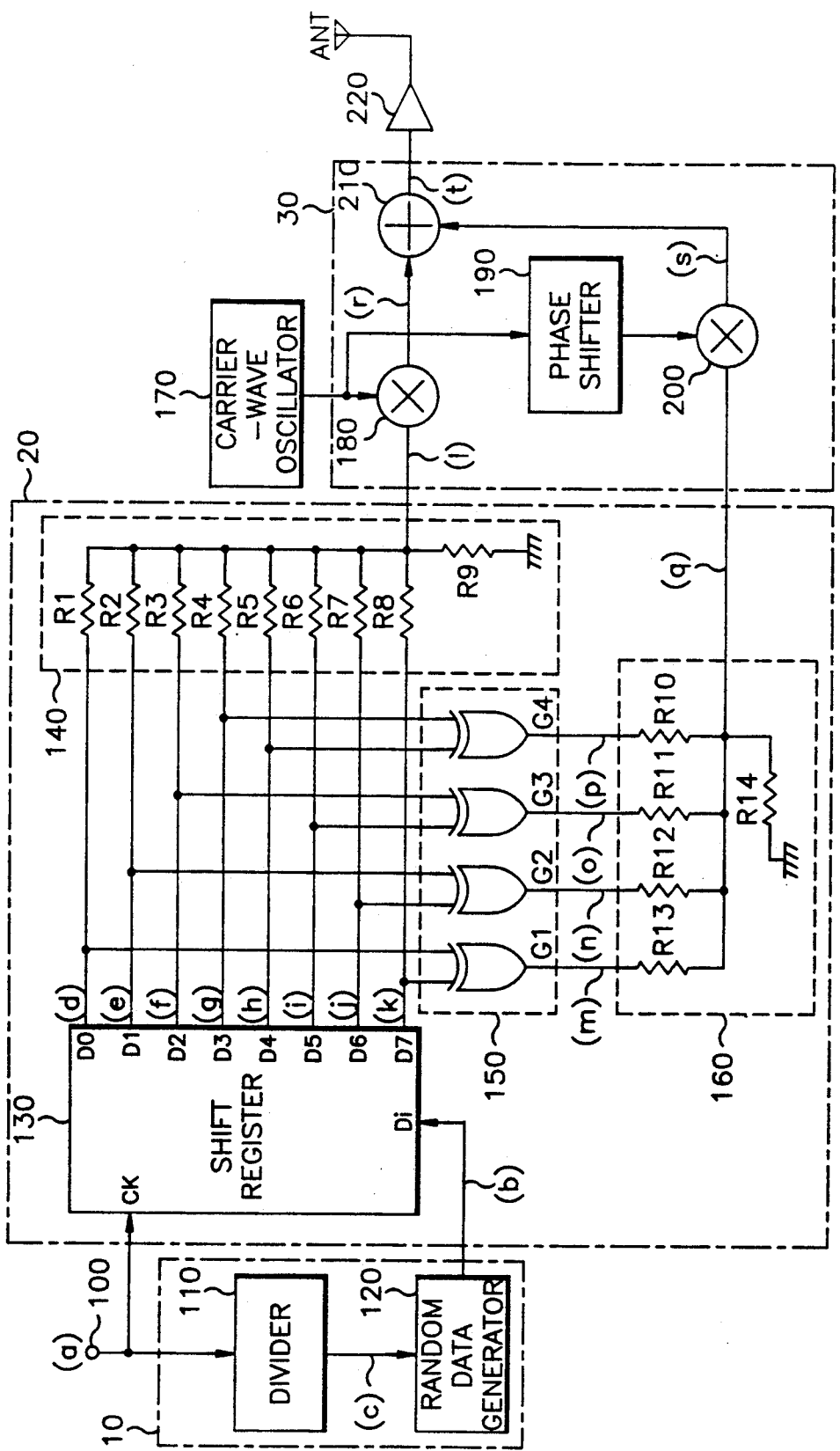
FIG. 3 is a schematic block diagram indicating a preferred embodiment of a BPSK modulation circuit according to the present invention.

Referring to FIG. 3, the BPSK modulation circuit according to the invention has a clock input 100, a data generator circuit 10, a data converter circuitry 20, a carrier-wave oscillator 170, a modulation circuitry 30, an amplifier 220 in C-class, and an antenna (ANT). The clock input 100 receives a system clock. The data generator 10 is connected to receive the system clock, for providing random digital data in synchronization with the system clock, and the random digital data is divided from the system clock. The data converter 20 is connected to receive the system clock and an output of the data generator, for providing an in-phase signal component and a quadra-phase signal component in synchronization with the system clock, and the in-phase and quadra-phase signal components may be of step waveform. The modulation circuit 30 is connected to receive both the in-phase and quadra-phase signal components from the data conversion means, for providing a phase modulation signal of constant envelope on a given carrier-wave signal for the digital data transmission. The in-phase signal component is processed in a double-balanced modulation with the carrier-wave and the quadra-phase signal component is processed in a single-balanced modulation with a phase-shifted signal of the carrier-wave, wherein both the double-balanced modulation signal and the single-balanced modulation signal are added to each other.

The amplifier 220 receives an output of the modulation circuit 30 to therefrom amplify the received output in C-class operation mode. The antenna is coupled to receive the amplified output of the amplifier 22 for irradiation of the transmission signal into the air.

In addition, the data generator 10 is constructed with a divider 110 receiving the system clock to therefrom provide a divided clock, and a random data generator coupled to receive the divided clock for providing a given random digital data.

Further, the data converter 20 includes a shift register 130 connected to receive the system clock and the random digital data, for providing in parallel a plurality of digital data sequentially shifted from the random digital data in synchronism with the system clock, a first resistance array 140 connected to receive the parallel data from the shift register, for providing the in-phase signal component produced in dependence upon multiplication and adding operation therein, wherein the first resistance array has a plurality of resistors each coupled to corresponding ones of outputs of the shift register, a gate array 150 having a plurality of logic gates, each gate being connected to receive a pair of selected two outputs of the shift register, and a second resistance array 160 connected to receive an output of the gate array, for providing the quadra-phase signal component produced in dependence upon a multiplication and adding operation therein, wherein the second resistance array has a plurality of resistors each coupled to corresponding ones of the logic gates of the gate array.

Furthermore, the first and second resistance arrays 140 and 160 include a plurality of a resistors R1–R9 and R10–R14, and the gate array 150 includes a plurality of logic gates G1 to G4.

Figure 4:
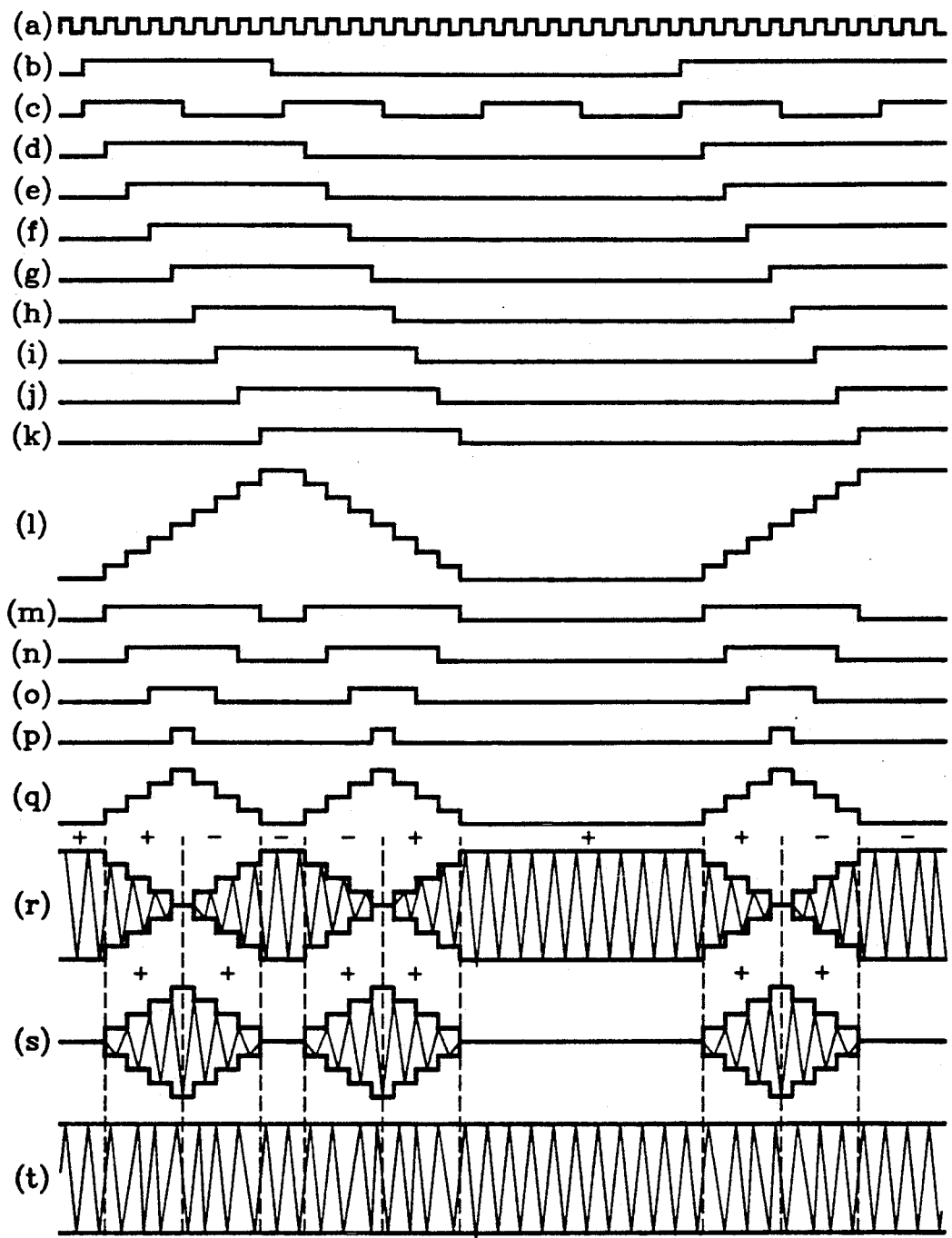
FIG. 4 illustrates waveform and timing diagrams for showing every operation stage in the modulation circuit according to FIG. 3.

Referring to FIG. 4, various timing diagrams for showing every operation stage in the circuit of FIG. 3, are indicated. In the drawing of FIG. 4, (a) shows a system clock, (b) an output waveform of the random data generator 120, (c) a waveform divided from the system clock (a) by the divider 110, and (d) to (k) waveforms provided by a shift operation of the waveform (b) in the shift register 130 in accordance with the system clock (a). Further, (1) shows an in-phase data waveform as an output of the first resistance array 140 which processes adding of the outputs (d) to (k) from the shift register 130, (m) a waveform of EXCLUSIVE-ORing operation of the waveforms (d) and (k), (n) a waveform of EXCLUSIVE-ORing operation of the waveforms (e) and (j), (o) a waveform of EXCLUSIVE-ORing operation of the waveforms (f) and (i), (p) a waveform of EXCLUSIVE-ORing operation of the waveforms (g) and (h), and (q) a quadra-phase data waveform as an output of the second resistance array 160 which processes adding of the outputs (m) to (p) of the EXCLUSIVE-OR gates G1 to G4. Furthermore, (r) shows a waveform multiplied by a carrier-wave of the in-phase waveform (1), (s) a waveform multiplied by an output of the phase shifter 190 which shifts in 90° the phase of the carrier-wave, of the quadra-phase data waveform (q), and (t) a modulation output signal resulting from adding of the waveforms (r) and (s).

Referring to the above-described construction, the operation of the BPSK modulation will be described in further detail, hereinafter. Once a system clock (a) is applied through the clock input 100 to the divider 110 in the data generator section 10, the system clock is divided by a given ratio, as shown in the waveform (c) of FIG. 4. The random data generator 120 receives an output (c) of the divider to therefrom provide random digital data shown at (b) in FIG. 4. The shift register 130 receives at its clock terminal the system clock (a) and the output (b) of the random data generator 120 to therefrom provide at its output (D0–D7) a series of shifted digital data, as shown at (d) to (k) in FIG. 4. Here, the output data (d) in $D_0$ output is a digital signal delayed by one clock period time of the output (b) of the random data generator 120, the output data (e) in $D_1$ output is a digital signal delayed by one clock period time of the $D_0$ output data (d), and the output data (f) in $D_2$ output is likewise a digital signal delayed by the same clock period of the D1 output data (e). Other remaining output data (g)–(k) in the $D_3$–$D_7$ output of the shift register 130 are provided likewise by a similar shifting operation from a preceding stage. As a result, the output data in the $D_7$ output is obtained by delaying in 8 times the output random data (b) of the random data generator. All the input/output operation in the shift register 130 is adapted to be synchronized with the system clock (a) from the clock input 100.

Meanwhile, the first resistance array 140 receives a series of the shifted digital data from the shift register 130, wherein digital data are multiplied by a corresponding resistance value by means of a corresponding resister R1 to R8 each coupled to a respective output of the shift register 130 and thereafter are added up altogether to therefrom produce an in-phase signal as shown at (l) in FIG. 4. Further, the gate array 150, coupled to the second resistance array 160, also receives the digital data output from the shift register 130, and then performs an EXCLUSIVE-OR operation on selected pairs of outputs, for example, a pair of $D_0$ and $D_7$, or $D_1$ and $D_6$, of the series of shifted digital data in the outputs $D_0$ and $D_7$. The second resistance array 160 having a series of resistors $R_{10}$ to $R_{13}$ receives corresponding outputs (m) to (p) of the gate array 150 to multiply same outputs by a corresponding resistance and to produce a resultant quadra-phase signal by adding together all the multiplied outputs of the respective resisters $R_{10}$ to $R_{13}$.

Here, assuming that the in-phase signal is represented by I(t) and the quadra-phase signal is represented by Q(t), a relation of $[I(t)]^2 + [Q(t)]^2 = C$ should be maintained, wherein C is a constant, in order to obtain a constant envelope characteristic for a BPSK modulation signal subsequent to a given modulation in accordance with the present invention. Thus, it would be well understood by an expert in the art that such a relation can easily be obtained by arranging the corresponding resistance values or combination thereof in the first and second resistance arrays 140 and 160.

The carrier-wave generator 170 provides a carrier-wave to the first multiplier 180, which multiplies the carrier-wave by the output (1) of the first resistance array 140 to therefrom produce a double-balanced modulation signal as shown by the waveform (r) of FIG. 4. Further, the second multiplier 200 receives an output of the phase shifter 190, which output is multiplied by the output (g) of the second resistance array (160) to therefrom produce a single-balanced modulation signal as shown by the waveform (s) of FIG. 4. Here, the adder 210 adds the output (r) of the first multiplier 180 to the output (s) of the second multiplier 200, to thereby provide a resultant BPSK modulation signal with constant envelope characteristic, as seen by the waveform (t) of FIG. 4. Hence, the resultant BPSK output signal with constant envelope can be precisely amplified even in C-class operation in the power amplifier 220, without any signal distortion due to undesirable fluctuation of an amplitude level in the vicinity of its phase shifting position. This enables the reception of quality data by a receiving party upon transmission of a BPSK modulation signal in a digital telecommunication system.

As is apparent from the foregoing description, the present invention makes it possible to amplify given digital data at a constant and adequate level, even in the phase shifting locations or their vicinity, for example, at zero-crossing positions of a BPSK modulation signal in a digital transmission system, so it improves the transmission efficiency of digital telecommunication owing to the reception and transmission of quality data.

While the foregoing provides a full and complete disclosure of the preferred embodiments of the present invention, various modifications, alternate constructions and equivalents thereof may be employed without departing from the true spirit and scope of the invention. Therefore, the above description and illustration should not be construed as limiting the scope of the invention, which is defined by the appended claims.

I claim:

1. A biphase shift keying (BPSK) modulation circuit for a digital data transmission system, comprising:
   a clock input receiving a system clock;
   data generation means, connected to receive the system clock, for providing random digital data in synchronization with the system clock, said random digital data being divided from the system clock;
   data conversion means, connected to receive the system clock and an output of said data generation means, for providing an in-phase signal component and a quadra-phase signal component in synchronization with the system clock, said in-phase and quadra-phase signal components being of step waveform; and
   modulation means, connected to receive both the in-phase and quadra-phase signal components from said data conversion means, for providing a phase modulation signal of constant envelope on a give carrier-wave signal for the digital data transmission, said in-phase signal component being processed in a double-balanced modulation with the carrier-wave and said quadra-phase signal component being processed in a single-balanced modulation with a phase-shifted signal of the carrier-wave, wherein both of said double-balanced modulation signal and said single-balanced modulation signal are added to each other.

2. The biphase shift keying modulation circuit according to claim 1, wherein said data generation means comprises a divider receiving the system clock to therefrom provide a divided clock, and a random data generator coupled to receive the divided clock for providing a given random digital data.

3. The biphase shift keying modulation circuit according to claim 2, wherein said data conversion means comprises:
   a shift register, connected to receive the system clock and the random digital data, for providing in parallel a plurality of digital data sequentially shifted from the random digital data in synchronization with the system clock;
   a first resistance array, connected to receive the parallel digital data from said shift register, for providing the in-phase signal component produced in dependence upon multiplication and adding operation therein, said first resistance array having a plurality of resistors each coupled to corresponding ones of outputs of said shift register;
   a gate array having a plurality of logic gates, each gate being connected to receive a pair of two selected outputs of said shift register; and
   a second resistance array, connected to receive an output of said gate array, for providing the quadra-phase signal component produced in dependence upon multiplication and adding operation therein, said second resistance array having a plurality of resistors each coupled to corresponding ones of the logic gates of said gate array.

4. The biphase shift keying modulation circuit according to claim 3, wherein said logic gates each comprise an EXCLUSIVE-ORing logic gate.

5. The biphase shift keying modulation circuit according to claim 1, wherein said modulation means comprises:
   a first multiplier connected to receive the in-phase signal component, for providing a double-balanced modulation component on basis of the carrier-wave;
   a phase shifter connected to receive the carrier-wave for phase shifting the carrier-wave;
   a second multiplier connected to receive the quadra-phase signal component on the basis of the phase-shifted carrier-wave; and
   an adder connected to add both the outputs of the first and second multipliers, for therefrom producing a resultant biphase shift keying modulation signal.

6. The biphase shift keying modulation circuit according to claim 5, further comprising an amplifier for amplifying the biphase shift keying modulation signal from said modulation means.

7. The biphase shift keying modulation circuit according to claim 6, further comprising an antenna device coupled to the amplifier, for transmission of the modulation signal into the air.

8. The biphase shift keying modulation circuit according to claim 6, wherein said amplifier is of a C-class operation mode.

9. The biphase shift keying modulation circuit according to claim 5, wherein said phase shifter is that of performing a 90-degree phase shifting operation to an input signal.

10. The biphase shift keying modulation circuit according to claim 3, wherein each resistance of said first and second resistance array is arranged to meet the following relationship:

$$[I(t)]^2 + [Q(t)]^2 = C$$

wherein,
   I(t) represents the in-phase signal component,
   Q(t) represents the quadra-phase signal component, and
   C is a given constant.

11. The biphase shift keying modulation circuit according to claim 1, further comprising a carrier-wave generation means connected to said modulation means for providing the carrier-wave.

* * * * *

UNITED STATES PATENT AND TRADEMARK OFFICE
CERTIFICATE OF CORRECTION

PATENT NO. : 5,148,127  Page 1 of 2
DATED : 15 September 1992
INVENTOR(S) : Byoung-Jin CHEON It is certified that error appears in the above-identified patent and that said Letters Patent is hereby corrected as shown below:

IN THE ABSTRACT

Line 22,   replace "quadraphase" with --quadra-phase--.

Column 1,   Line 18,   replace "in phase" with --in-phase--.

Column 2,   Line 53,   replace "22" with --220--.

Column 3,   Line 22,   replace "(b)" with --(c)--.

Column 4,   Line 19,   replace "a" with --each--; and

Line 53,   delete "the".

UNITED STATES PATENT AND TRADEMARK OFFICE
CERTIFICATE OF CORRECTION

PATENT NO. : 5,148,127                                          Page 2 of 2

DATED : September 15, 1992

INVENTOR(S) : Byoung-Jin CHEON

It is certified that error appears in the above-indentified patent and that said Letters Patent is hereby corrected as shown below:

Column 6, line 21, replace "phase" (second occurrence) with --phased--.

Signed and Sealed this

Thirty-first Day of August, 1993

Attest:

BRUCE LEHMAN

Attesting Officer            Commissioner of Patents and Trademarks